(12) United States Patent
Hagiwara

(10) Patent No.: US 8,320,018 B2
(45) Date of Patent: Nov. 27, 2012

(54) METHOD AND MEANS FOR CONVERTING IMAGE DATA IN ENCODED FORMAT

(75) Inventor: Katsuyuki Hagiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/351,656

(22) Filed: Jan. 17, 2012

(65) Prior Publication Data

US 2012/0113447 A1     May 10, 2012

Related U.S. Application Data

(62) Division of application No. 11/772,981, filed on Jul. 3, 2007, now Pat. No. 8,134,742.

(30) Foreign Application Priority Data

Jul. 7, 2006 (JP) ................................ 2006-188679
Jul. 7, 2006 (JP) ................................ 2006-188680

(51) Int. Cl.
*G06F 15/00* (2006.01)

(52) U.S. Cl. ......... 358/1.9; 358/448; 358/443; 358/400; 358/524; 358/401; 358/518; 382/245; 382/244; 382/232

(58) Field of Classification Search ........................ None
See application file for complete search history.

(56) References Cited

U.S. PATENT DOCUMENTS

| | | | |
|---|---|---|---|
| 5,377,023 A | 12/1994 | Sano et al. | |
| 6,108,102 A | 8/2000 | Tanaka et al. | |
| 6,597,812 B1 * | 7/2003 | Fallon et al. | .............. 382/232 |
| 6,996,284 B2 | 2/2006 | Earl et al. | |
| 2006/0087708 A1 | 4/2006 | Lapstun et al. | |
| 2006/0114528 A1 | 6/2006 | Ito | |
| 2007/0216696 A1 | 9/2007 | Capper et al. | |

FOREIGN PATENT DOCUMENTS

| | | |
|---|---|---|
| JP | 07-030746 | 1/1995 |
| JP | 10-271322 | 10/1998 |
| JP | 2001-313834 | 11/2001 |
| JP | 2004-254187 | 9/2004 |
| JP | 2004-274131 | 9/2004 |
| JP | 2004-328160 | 11/2004 |

OTHER PUBLICATIONS

Matsui, Japanese Application No. 2004-274131, Sep. 30, 2004.*

\* cited by examiner

*Primary Examiner* — Benny Q Tieu
*Assistant Examiner* — Paul F Payer
(74) *Attorney, Agent, or Firm* — Fitzpatrick Cella Harper & Scinto

(57) ABSTRACT

An output device which outputs pixel data corresponding to a color material used by a printing unit to the printing unit includes an image buffer which stores image data, a generation unit which generates density data corresponding to the color material based on image data read out from the image buffer, a print buffer which stores density data generated by the generation unit, and a conversion unit which converts density data read out from the print buffer into pixel data corresponding to the resolution of the printing unit synchronously with the printing unit.

4 Claims, 16 Drawing Sheets

FIG. 13

|   | 1502-2 | 1501-2 | 1701-2 |
|---|---|---|---|
| 1 | DICTIONARY INDEX | PIXEL DATA (RGB) | PIXEL DATA (CMYK) |
| 2 | DICTIONARY INDEX | PIXEL DATA (RGB) | PIXEL DATA (CMYK) |
| 3 | DICTIONARY INDEX | PIXEL DATA (RGB) | PIXEL DATA (CMYK) |
| 4 | DICTIONARY INDEX | PIXEL DATA (RGB) | PIXEL DATA (CMYK) |

⋮

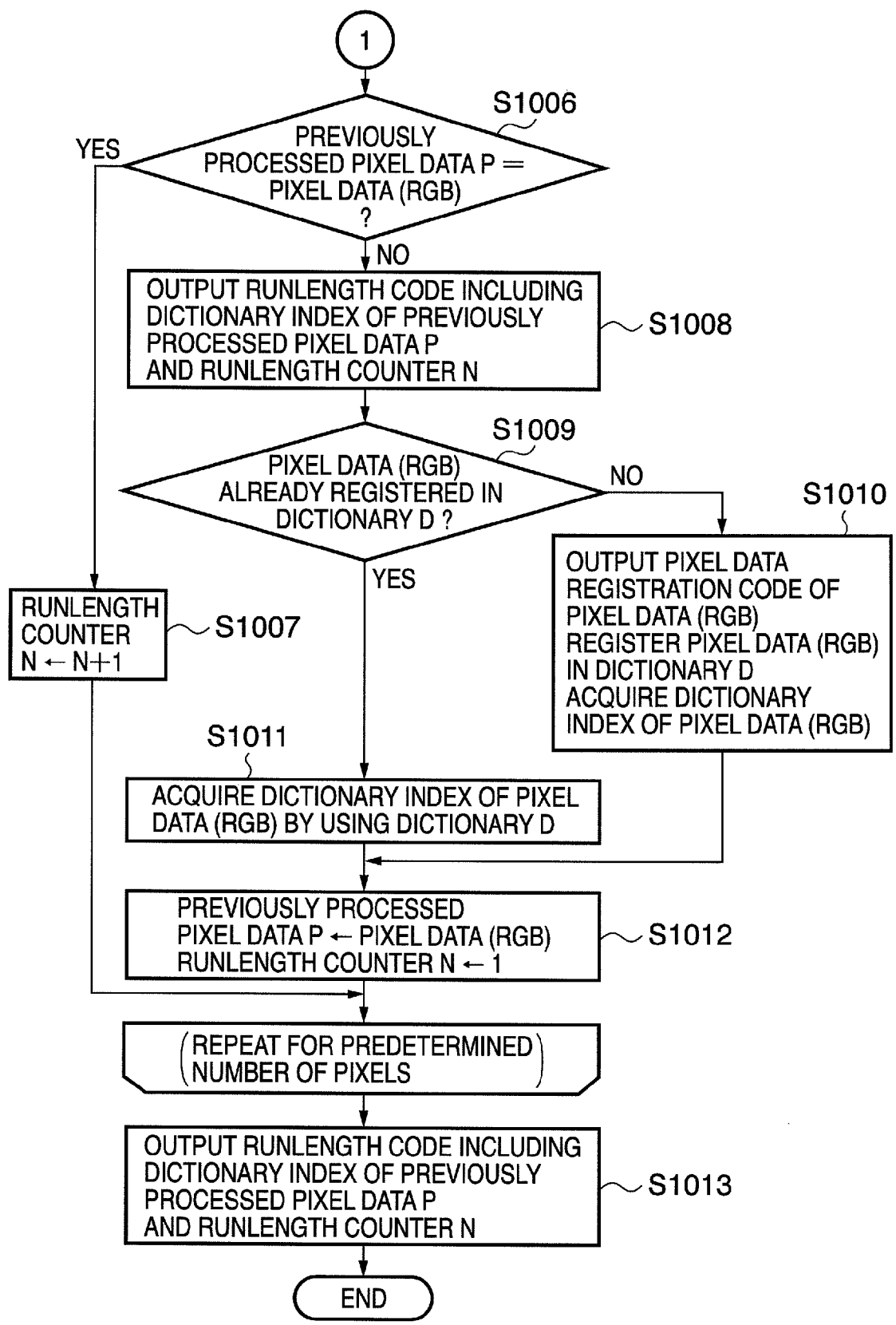
F I G. 14B

METHOD AND MEANS FOR CONVERTING IMAGE DATA IN ENCODED FORMAT

This is a division of U.S. patent application Ser. No. 11/772,981, filed Jul. 3, 2007.

BACKGROUND OF THE INVENTION

1. Field of the Invention

The present invention relates to an output device, image data conversion device, and method which outputs pixel data corresponding to a color material used by a printing means to the printing means.

2. Description of the Related Art

As functions of an image processing device used when a printing apparatus prints, those shown in FIG. 1 are conventionally known.

Referring to FIG. 1, reference numeral 101 denotes an image construction unit. The image construction unit 101 rasterizes received print data to generate drawing data formed of a series of pixel data. Reference numeral 102 denotes an image buffer. The image buffer 102 temporarily stores drawing data generated in the image construction unit 101.

Reference numeral 103 denotes a color correction unit. The color correction unit 103 reads out each pixel data of drawing data stored in the image buffer 102 and performs color correction. This color correction matches the color gamut of an input color space with that of an output color space. Reference numeral 104 denotes a color separation unit. The color separation unit 104 converts color-corrected drawing data into density data (color material density data) for each color material. Japanese Patent Laid-Open No. 2004-274131 proposes an exemplary conversion method using a look-up table (cache memory).

Reference numeral 105 denotes a quantization unit. The quantization unit 105 converts color material density data into color material amount data (operation data for operating a print head of the printing unit 107) corresponding to the resolution and number of gray levels of the printing unit 107. Reference numeral 106 denotes a print buffer. The print buffer 106 stores color material amount data required for a predetermined operation cycle (a process for one scanning in an inkjet printing unit, and a process for one page in an electrophotographic printing unit). With this arrangement, the printing unit 107 can continuously perform the predetermined operation cycles.

The printing unit 107 prints on a medium such as a paper sheet based on color material amount data. As a printing method, for example, an inkjet method, electrophotographic method, or the like is available.

In this arrangement, the capacity of the print buffer 106 depends on the structure of the printing unit 107. FIG. 2 is a view schematically showing the structure of an inkjet printing unit. As shown in FIG. 2, print heads of respective colors are arranged in the main scanning direction, and each print head has a plurality of nozzles arranged in the sub-scanning direction. Accordingly, the amount of color material amount data for one scanning in the printing unit 107 is (the number of dots in the main scanning direction)×the number of nozzles×the number of colors (the number of planes). The number of dots in the main scanning direction is determined by a print width and output resolution in the main scanning direction.

On the other hand, in order to improve the output image quality of a printing apparatus, the output resolution is improving and the number of ink colors is increasing.

As the output resolution improves and the number of ink colors increases, the capacity required of the print buffer 106 is significantly increasing. Assume that four-color printing with an output resolution of 600 dpi in the main scanning direction is compared with eight-color printing with an output resolution of 4800 dpi in the main scanning direction. When the number of nozzles is the same, the amount of color material amount data for one scanning is sixteen times larger in the latter case. For this reason, an increase in the cost of the print buffer along with improvement of the output image quality is obviously becoming a problem.

Also, when a look-up table used for color space conversion in a printing apparatus as described above is utilized by storing it in, for example, a dynamic RAM, a read operation of grid point data takes time and color space conversion delays. As a result, the whole printing process also delays. For this reason, in the printing apparatus as described above, it is demanded to reduce the processing load of color space conversion to prevent its delay.

SUMMARY OF THE INVENTION

It is an object of the present invention to provide an output device which outputs pixel data corresponding to a color material used by a printing unit to the printing unit, comprising:

a first storage unit configured to store image data;

a generation unit configured to generate density data corresponding to the color material based on image data read out from the first storage unit;

a second storage unit configured to store density data generated by the generation unit; and a conversion unit configured to convert density data read out from the second storage unit into pixel data corresponding to a resolution of the printing unit synchronously with the printing unit.

It is another object of the present invention to provide an output device which outputs pixel data corresponding to a color material used by a printing unit to the printing unit, comprising:

an encoding unit configured to encode image data;

an extraction unit configured to extract color information from encoded image data;

a conversion unit configured to convert extracted color information into a color space of the printing unit;

a replacement unit configured to replace color information of encoded image data by converted color information;

a decoding unit configured to decode encoded image data having color information replaced by the replacement unit; and a conversion unit configured to convert encoded image data decoded by the decoding unit into pixel data corresponding to a resolution of the printing unit.

It is still another object of the present invention to provide an output device which outputs pixel data corresponding to a color material used by a printing unit to the printing unit, comprising:

a count unit configured to count continuous first image data having an identical value;

a first image data conversion unit configured to convert the first image data into second image data;

a registration unit configured to register the first image data and the second image data;

an output unit configured to output second image data registered by the registration unit in accordance with a count of the count unit; and a second image data conversion unit configured to convert second image data output by the output unit into pixel data corresponding to a resolution of the printing unit, wherein the first image data conversion unit converts first image data which is not registered by the registration unit into second image data.

It is still another object of the present invention to provide an image data conversion device comprising:

an encoding unit configured to encode image data;

an extraction unit configured to extract color information from encoded image data;

a conversion unit configured to convert extracted color information into a color space of the printing unit; and a replacement unit configured to replace color information of encoded image data by converted color information.

It is still another object of the present invention to provide an image data conversion device comprising:

a count unit configured to count continuous first image data having an identical value;

a conversion unit configured to convert the first image data into second image data;

a registration unit configured to register the first image data and the second image data; and an output unit configured to output second image data registered by the registration unit in accordance with a count of the count unit, wherein the conversion unit converts first image data which is not registered by the registration unit into second image data.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a view illustrating a dictionary generated in the image processing device according to the fifth embodiment of the present invention;

FIGS. 14A and 14B are flowcharts illustrating the sequence of a compression process in the image processing device according to the fifth embodiment of the present invention.

DESCRIPTION OF THE EMBODIMENTS

Exemplary embodiments of the present invention will be described below in detail with reference to the accompanying drawing as needed.

First Embodiment

Figure 1:
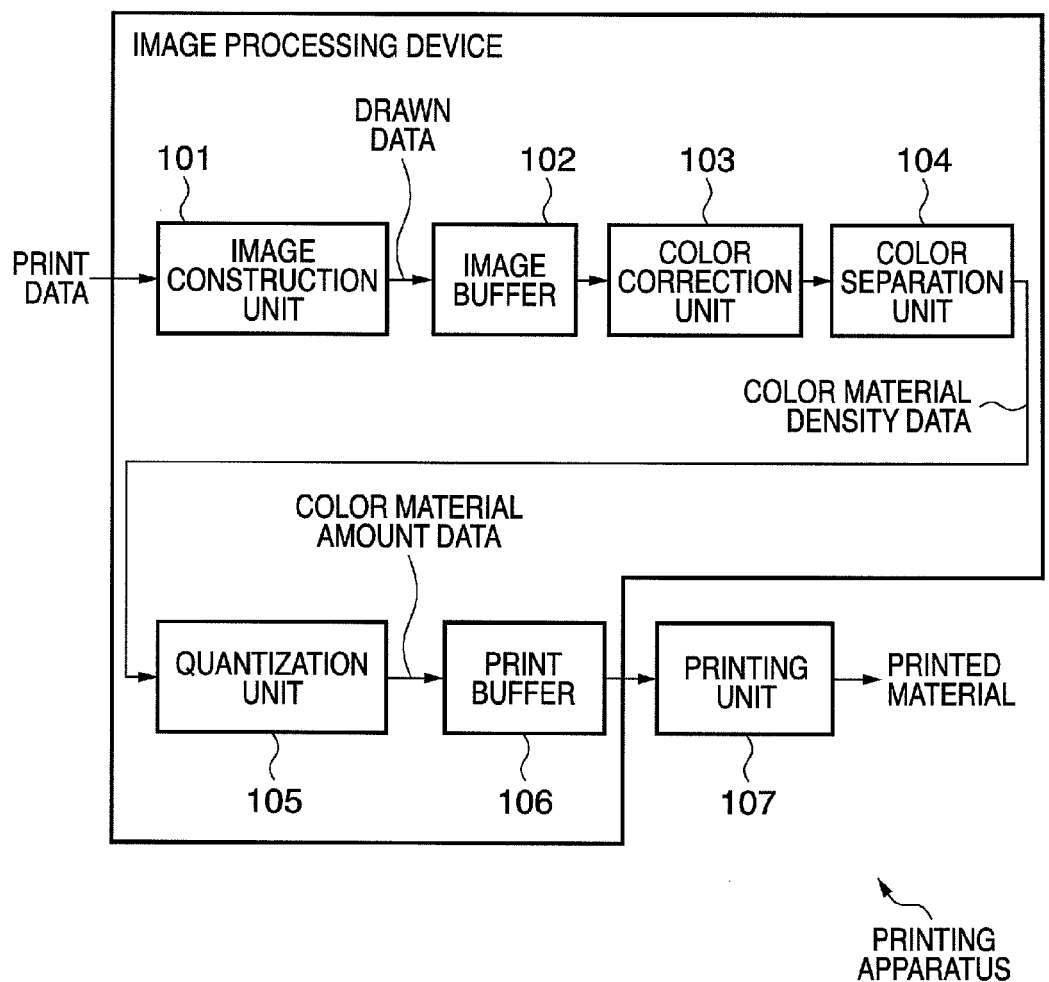
FIG. 1 is a block diagram showing the functional arrangement of a conventional printing apparatus.
Figure 2:
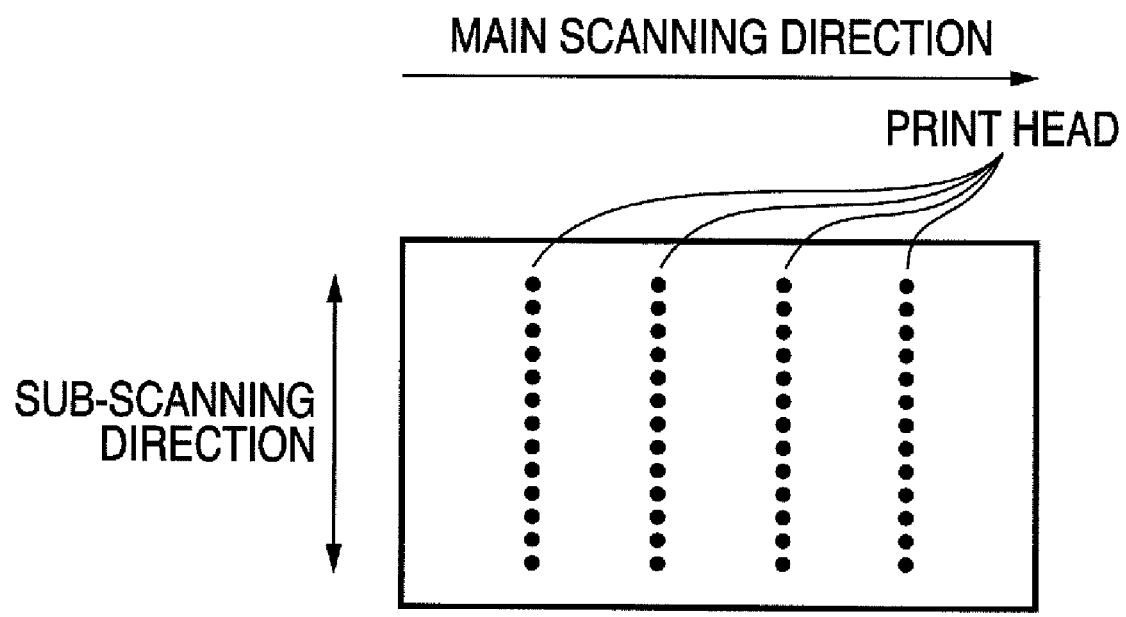
FIG. 2 is a view schematically showing the arrangement of inkjet print heads.
Figure 3:
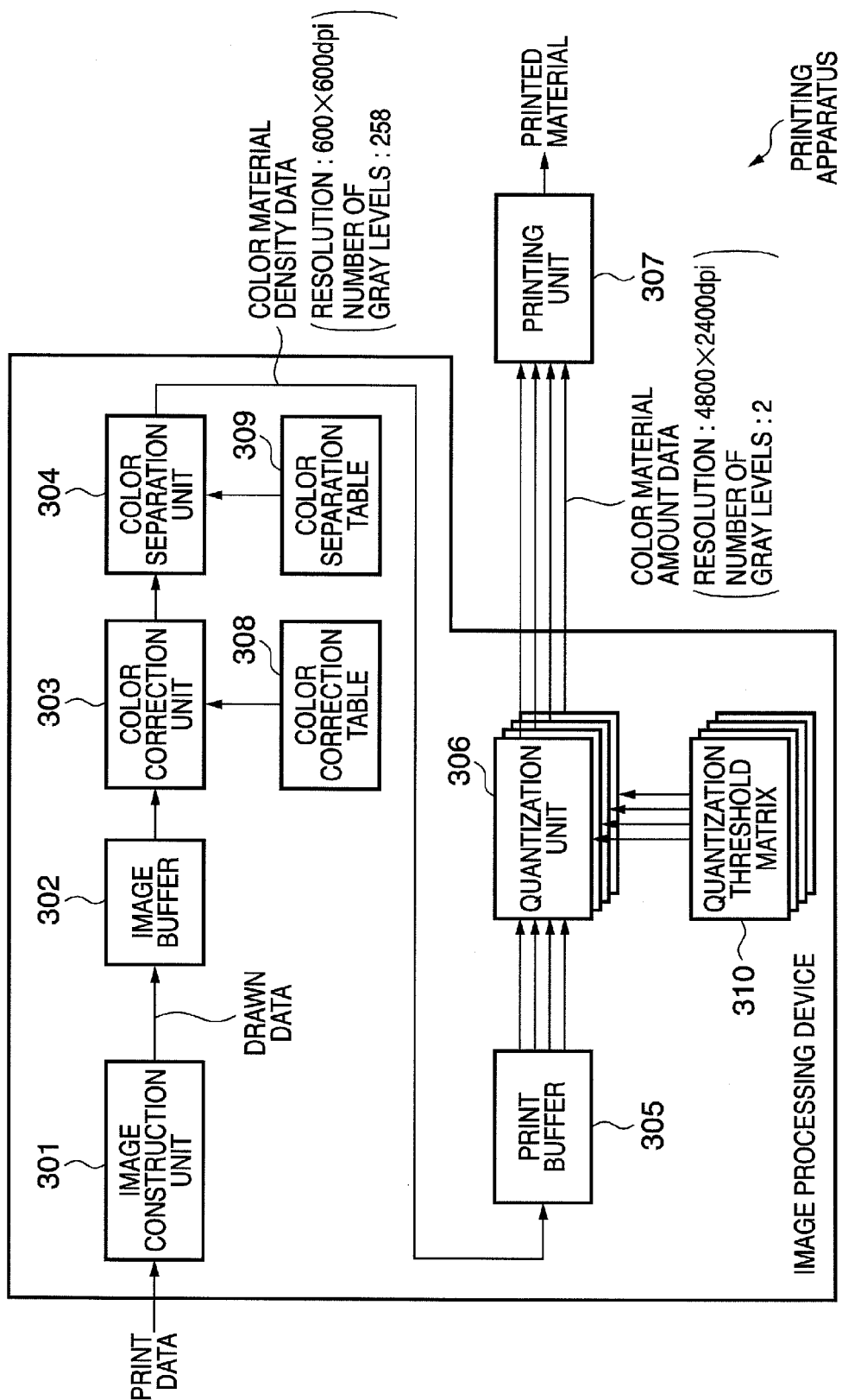
FIG. 3 is a block diagram showing the functional arrangement of a printing apparatus including an image processing device according to the first embodiment of the present invention.

FIG. 3 is a block diagram schematically showing the arrangement of a printing apparatus including an image processing device according to the first embodiment of the present invention. In this printing apparatus, a print buffer 305 connects to the input of a quantization unit 306. The functions of respective units will be sequentially described below.

<Function of Each Unit of Printing Apparatus>

Reference numeral 301 denotes an image construction unit. The image construction unit 301 rasterizes received print data to generate drawing data formed of a series of pixel data. In this embodiment, drawing data of 600 ppi is generated, as in a conventional case.

An image buffer 302 temporarily stores drawing data generated in the image construction unit 301. The image buffer 302 includes two areas to have a so-called double-buffering function. With this structure, image data generated by the image construction unit 301 is stored in one area and, at the same time, a color correction unit 303 can read out previously stored image data from the other area and process it.

Color correction by the color correction unit 303 matches the color gamut of an input color space with that of an output color space. The color correction unit 303 color-corrects drawing data read out from the image buffer 302 in a predetermined order. More specifically, the color correction unit 303 performs interpolation processing by using color correction grid point data of a grid point near the drawing data. Reference numeral 308 denotes a color correction table. The color correction table 308 holds the color correction results (color correction grid point data) of predetermined gird points.

A color separation unit 304 acquires color material density data from corresponding color-corrected drawing data. Color material density data is calculated by interpolation using color separation grid point data of a grid point near the color-corrected drawing data. Data is separated into eight colors in this embodiment. A color separation table 309 holds color material density data (color separation grid point data) of predetermined grid points.

The print buffer 305 stores color material density data required for a process for one scanning in a printing unit 307. The print buffer 305 includes two areas, as in the image buffer 302. With this structure, the color separation unit 304 stores color material density data in one area and, at the same time, the quantization unit 306 can read out previously stored color material density data from the other area.

The resolutions of color material density data output from the color correction unit 303 and color separation unit 304 are the same as that of print data input to the image construction unit 301. Accordingly, the resolution of color material density data stored in the print buffer 305 is the same (for example, 600×600 ppi) as that of drawing data generated in the image construction unit 301. The numbers of gray levels of drawing data in the image construction unit 301, color correction unit 303, and color separation unit 304 need not be the same, but are desirably at least 256 (8 bits) or more to obtain fine image quality.

The quantization unit 306 reads out color material density data stored in the print buffer 305 and converts the resolution and number of gray levels of the color material density data into those of the printing unit 307 to generate color material amount data (operation data to operate the print heads of the printing unit 307). In this embodiment, the input resolution is 600×600 ppi, the number of input gray levels is 256 (8 bits), the output resolution is 4800 (main scanning)×2400 (sub-scanning) dpi, and the number of output gray levels is 2 (1 bit).

The quantization unit 306 includes units for respective colors (eight colors). They are arranged in parallel and operate independent from each other. The quantization unit 306 determines an output value by comparing the magnitude of input color material density data with that of an element (quantization threshold) of a quantization threshold matrix 310, which corresponds to an output pixel position. The numbers of columns and rows of the quantization threshold matrix 310 are far smaller than the number of nozzles of a print head and a print width. The quantization unit 306 covers the whole printing area by repeatedly referring to the quantization threshold matrix 310 in a predetermined cycle.

Although the details will be described later, those skilled in the art will understand that it is relatively easy to ensure real-time synchronization of the quantization unit 306 with the operation of the printing unit 307 (the details of a process in the quantization unit 306 will be described later). In the printing apparatus according to this embodiment, a print buffer for storing data required for a process for one scanning in the printing unit 307 connects to the input of the quantization unit 306. With this structure, the print buffer 305 stores not color material amount data but color material density data. Therefore, the amount of data to be stored can be reduced.

The printing unit 307 prints on a medium such as a paper sheet based on color material amount data. As a printing method, for example, an inkjet method, electrophotographic method, or the like is available.

<Process Sequence in Quantization Unit 306>

Figure 4:
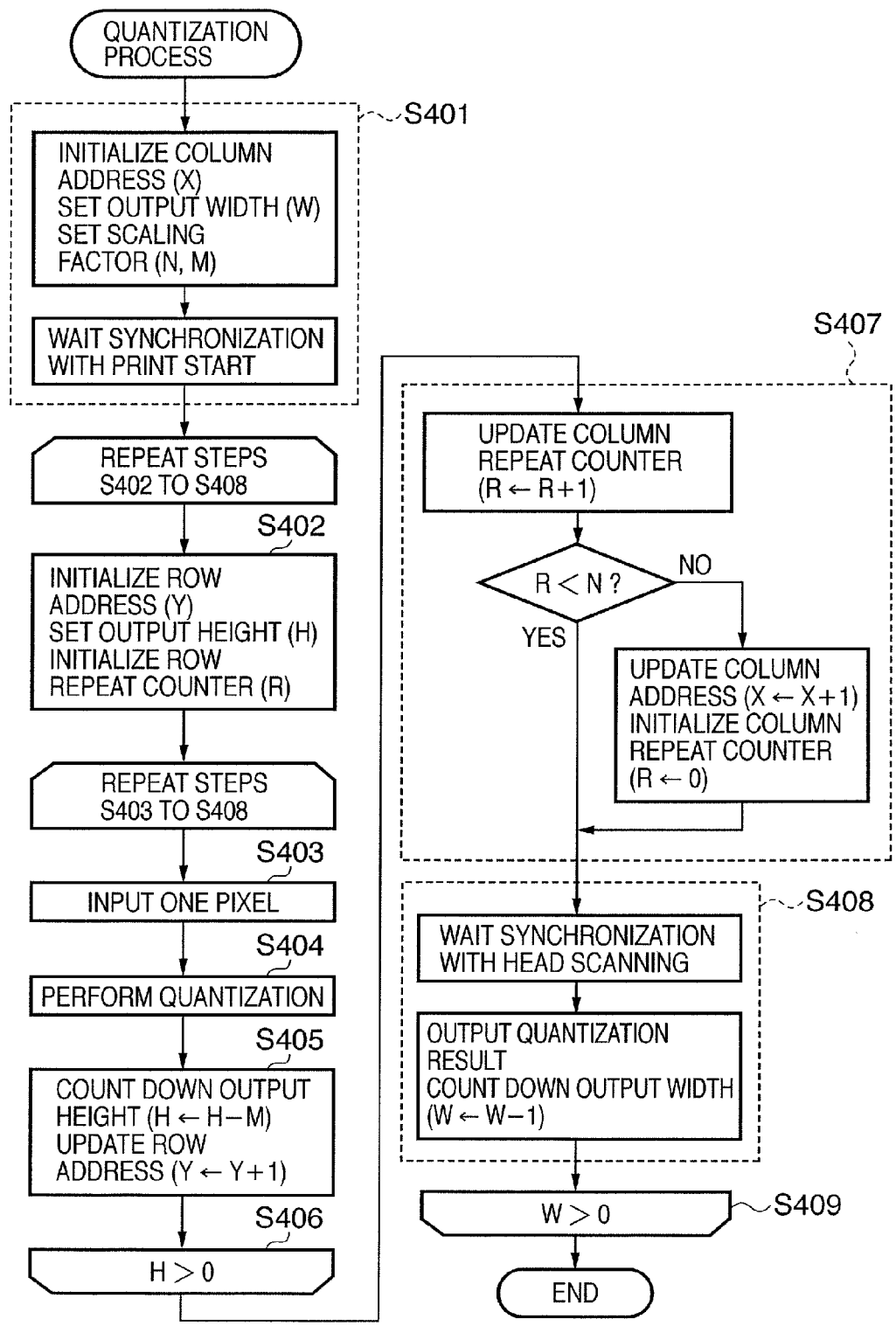
FIG. 4 is a flowchart illustrating the process sequence of a quantization unit synchronizing with a printing unit.

FIG. 4 is a flowchart illustrating the sequence of a quantization process in the quantization unit 306. In step S401, the quantization unit 306 initializes quantization and synchronizes it with start of scanning in the printing unit 307. In the following example, the size of a printing area is 38400×26400 dots (8×11 inch), and the number of nozzles of a print head corresponds to 768 dots.

The quantization unit 306 sets a column address X to 0 and a print width counter W to 38400, that is, the number of dots corresponding to the print width. The quantization unit 306 also sets a main scanning scaling factor N to 4800 dpi/600 dpi, that is, the ratio of the input/output resolutions, and a sub-scanning scaling factor to 2400 dpi/600 dpi, that is, the ratio of the input/output resolutions in the sub-scanning direction.

In steps S402 to S407, quantization of the number (768 dots) of the nozzles of the print head arrayed in the sub-scanning direction is performed.

In step S402, the quantization unit 306 sets a row address Y to 0 and an output height counter H to 768, that is, the number of nozzles of the print head, and initializes a column repeat counter R to 0.

In step S403, the quantization unit 306 acquires one density value corresponding to the column address X and row address Y from the print buffer 305, and M quantization thresholds which are determined by the output height counter H and print width counter W from the quantization threshold matrix 310.

Note that the column address X and row address Y do not refer to the column address and row address, respectively, of a memory device in the print buffer 305 or quantization threshold matrix 310.

In step S404, the quantization unit 306 performs M-dot quantization for one density value acquired in step S403. The quantization unit 306 compares the density value with the M-dot quantization thresholds acquired in step S403 to obtain M-dot quantization results. As a result of the comparison, when the density value is larger than the quantization threshold, 1 is set as the quantization result. Otherwise, 0 is set as the quantization result.

In step S405, the quantization unit 306 subtracts the number M of dots for one quantization from the output height counter H and updates the row address Y.

In step S406, the quantization unit 306 checks the value of the output height counter H and, when needed, repeats steps S403 to S405 to perform the processes for a number of times corresponding to that nozzles of the print head.

In step S407, the column address X is updated once for main scanning scaling factor N-time processes.

More specifically, while 0<R<N, the density values referred to by the same column address X are used in steps S403 to S405. Note that, since the print width counter W is updated in step S408, the quantization threshold is not always the same.

In accordance with the processes from step S402, the M-dot quantization results in the sub-scanning direction are obtained.

In step S408, the quantization unit 306 outputs the results while synchronizing with the printing unit 307. In step S409, the quantization unit 306 checks the print width counter W and, when needed, repeats processes from step S402 for a number of times corresponding to the print width. Quantization for one scanning and one color is performed as described above.

As has been described above, since the quantization unit 306 repeats a routine process, it is relatively easy to ensure the real-time synchronization with operation of the printing unit 307. Accordingly, when the print buffer 305 connects to the input of the quantization unit 306, data required for a predetermined operation cycle can be continuously provided to the printing unit 307.

In order to set offsets for respective colors in the main scanning direction of the print heads, for example, the synchronization timing of each color may be shifted from each other in step S401. Alternatively, in step S403, density values at different positions may be acquired from the print buffer 305 by setting offsets for respective colors in the column address X.

<Effect Obtained by Connecting Print Buffer 305 to Input of Quantization Unit 306>

When the print buffer 305 connects to the input of the quantization unit 306, the capacity of the print buffer 305 works as follows.

When the amount of input data for one scanning is compared with the amount of output data, the number of pixels is M×N (8×4) times and the number of gray levels is ⅛ times in the amount of output data. That is, the amount of data quadruples after quantization. Hence, when the print buffer 305 connects to the input of the quantization unit 306, the capacity required of the print buffer 305 can be ¼ of that required when the print buffer 305 connects to the output of the quantization unit 306.

As has been described above, according to the present invention, even when the output resolution in the main scanning direction or the number of colors (the number of planes) of the printing unit 307 increases, its adverse effect can be limited to quantization and the processes before quantization. As a result, the required capacity of the print buffer 305 becomes independent from the output resolution or the number of colors (the number of planes) of the printing unit 307, and therefore an increase in the capacity of the print buffer 305 can be avoided.

Second Embodiment

In the above-described first embodiment, an increase in the capacity of the print buffer is avoided by connecting the printing buffer 305 to the input of the quantization unit 306. However, the present invention is not limited to this.

Figure 5:
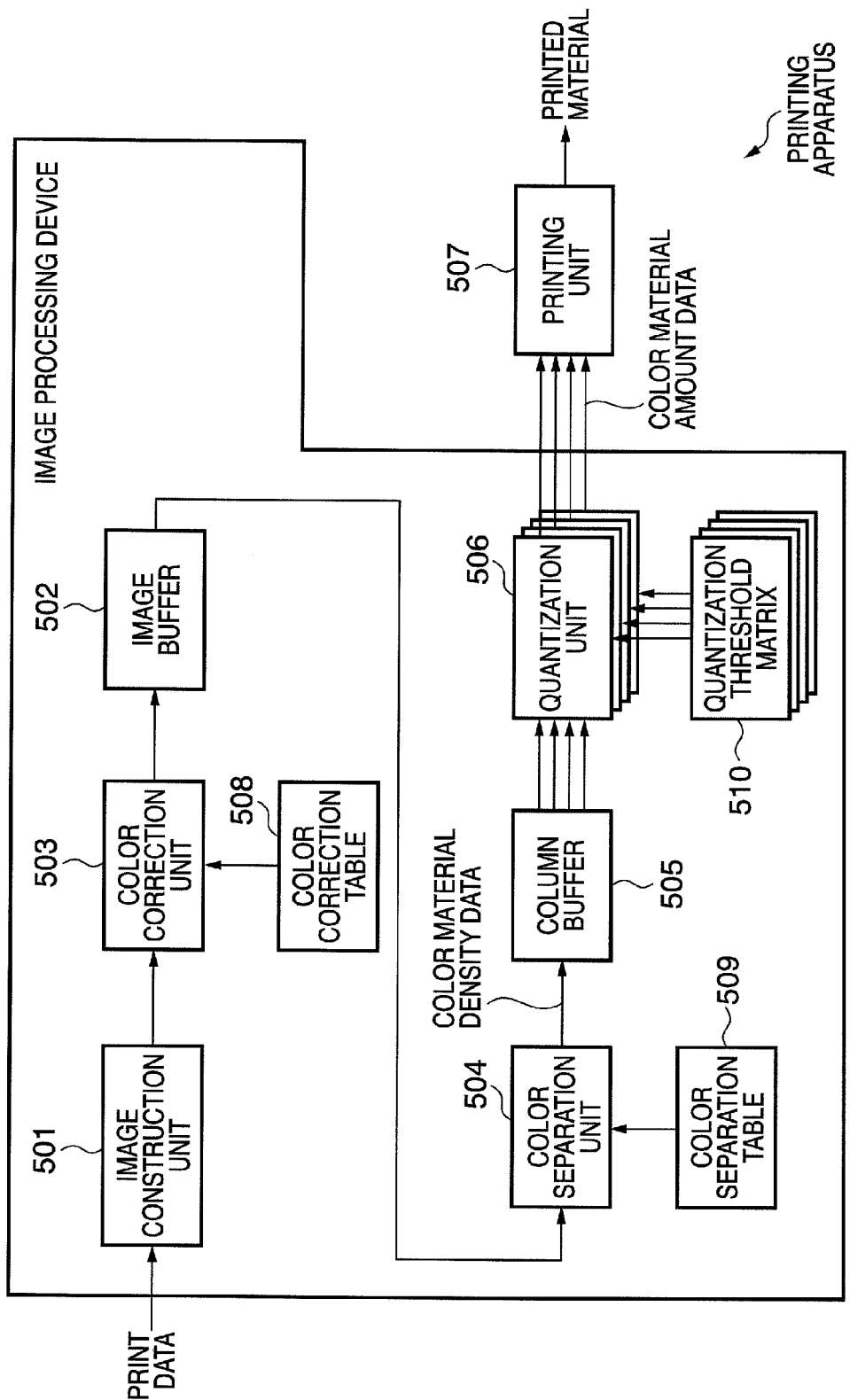
FIG. 5 is a block diagram showing the functional arrangement of a printing apparatus including an image processing device according to the second embodiment of the present invention.

FIG. 5 is a block diagram showing the functional arrangement of a printing apparatus including an image processing device according to this embodiment. This printing apparatus includes a FIFO buffer (column buffer 505) having less columns than the print buffer 305. The capacity required of the column buffer 505 is determined by the ratio of processing performances (speeds) of a printing unit 507 and color separation unit 504 and a scaling factor of a quantization unit 506.

If the color separation unit 504 operates sufficiently fast with respect to the printing unit 507, the column buffer needs only a capacity for one column. Therefore, the column buffer 505 can have a smaller capacity than the print buffer 305 of the first embodiment.

Note that when the color separation unit 504 operates sufficiently fast, in order to balance it with the operation speed of a color correction unit 503, an image buffer 502 is desirably inserted between the color correction unit 503 and color separation unit 504, as shown in FIG. 5.

Third Embodiment

Figure 6:
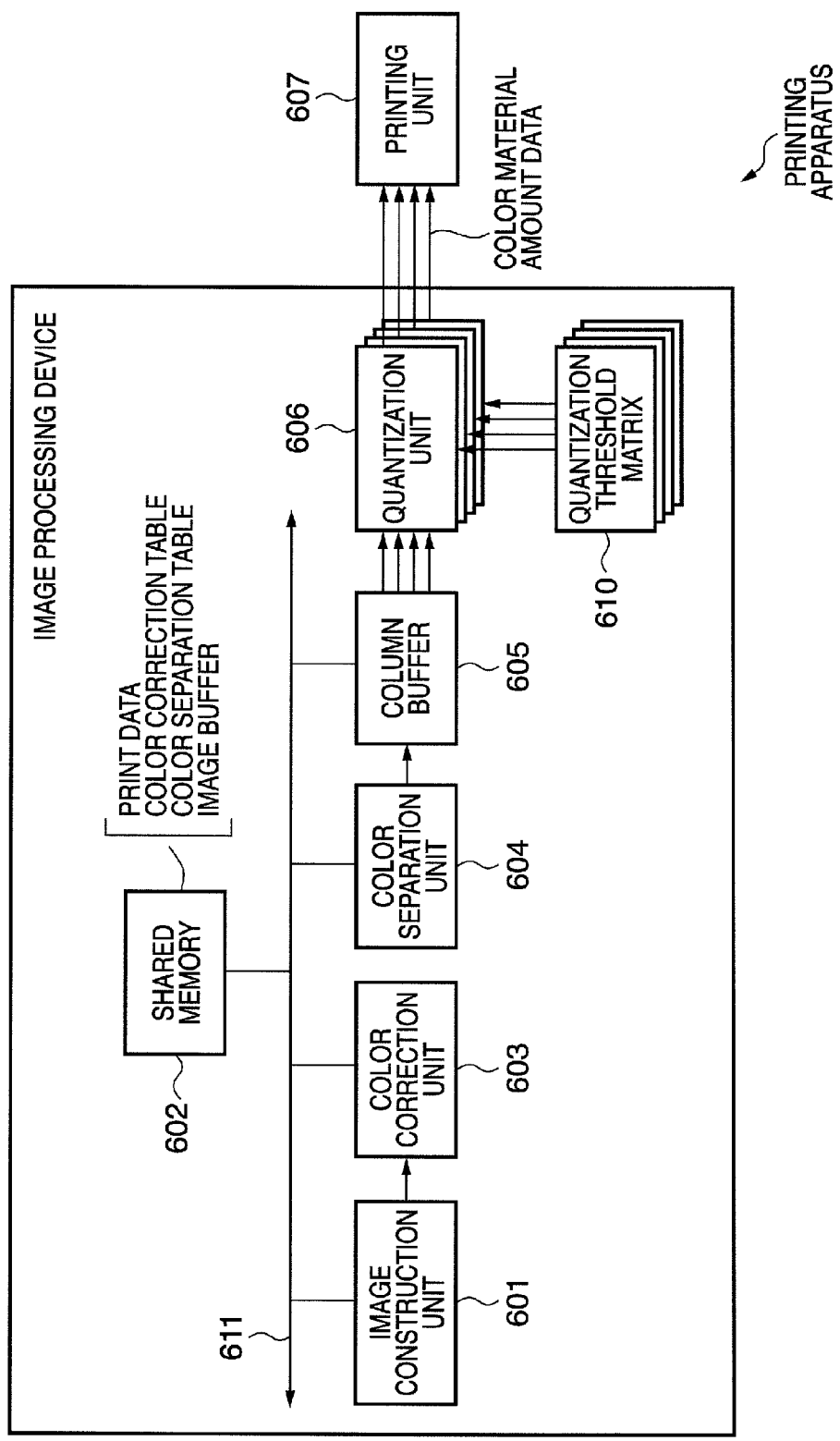
FIG. 6 is a block diagram showing the functional arrangement of a printing apparatus including an image processing device according to the third embodiment of the present invention.

FIG. 6 is a block diagram showing the functional arrangement of a printing apparatus including an image processing device according to the third embodiment of the present invention. As shown in FIG. 6, an image construction unit 601, color correction unit 603, and color separation unit 604 are respectively connected to a shared memory 602 via a memory bus 611. In addition to the units shown in FIG. 6, a reception unit (not shown) to receive print data, control processor (not shown), and the like are connected to the memory bus 611.

The shared memory 602 stores print data to be input to the image construction unit 601, a color correction table referred to by the color correction unit 603, and a color separation table referred to by the color separation unit 604. The arrangement shown in FIG. 6 has the merit of reducing the cost compared to the case wherein separate memories are arranged.

The capacity required of a column buffer 605 also changes depending on the ratio of the processing performances (speeds) of a printing unit 607 and the color separation unit 604, as described in the second embodiment. In order to reduce the capacity of the column buffer 605, the performance of the color separation unit 604 needs to be improved. However, when the color separation unit 604 uses a cache upon processing, as proposed in, for example, patent reference 1, the hit rate of the cache changes depending on drawing data to be processed and the performance varies.

In consideration of such a problem, the color separation unit 604 includes a color separation performance prediction unit (not shown) to predict the hit rate of the cache in the color separation unit 604 from the processing result of the color correction unit 603. When a decrease in hit rate of the cache in the color separation unit 604 for one scanning is predicted, the image construction unit 601 is instructed to temporarily stop image construction from the next scanning.

When the image construction unit 601 stops, input to the color correction unit 603 stops, and the color correction unit 603 also stops. Accordingly, in the shared memory 602, no access to print data and the color correction table is generated, and the bandwidth of the memory bus 611 available for the color separation unit 604 increases. As a result, the performance of the color separation unit 604 can temporarily improve.

As has been described above, when the performance of the color separation unit 604 is kept constant to prevent supply underruns of color material amount data to the printing unit 607, the capacity of the column buffer 605 can be reduced.

Fourth Embodiment

Figure 7:
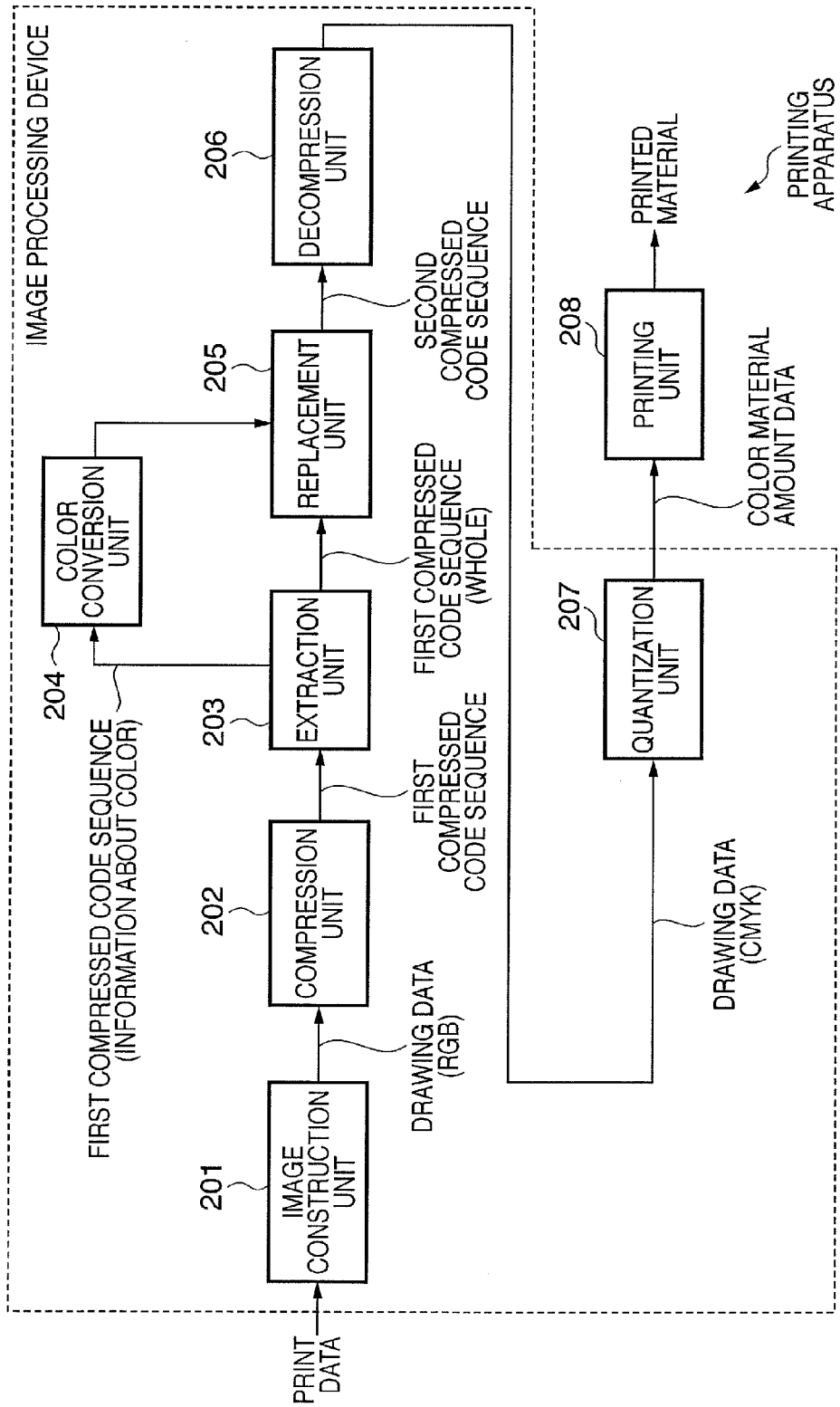
FIG. 7 is a block diagram showing the functional arrangement of a printing apparatus including an image processing device according to the fourth embodiment of the present invention.

FIG. 7 is a block diagram showing the functional arrangement of a printing apparatus including an image processing device according to the fourth embodiment of the present invention.

Reference numeral 201 denotes an image construction unit. The image construction unit 201 rasterizes input print data to generate drawing data formed of a series of pixel data.

Reference numeral 202 denotes a compression unit. The compression unit 202 compresses drawing data formed of a series of pixel data generated by the image construction unit 201 to generate the first compressed code sequence. As a drawing data compression method, for example, runlength compression is available.

Figure 8:
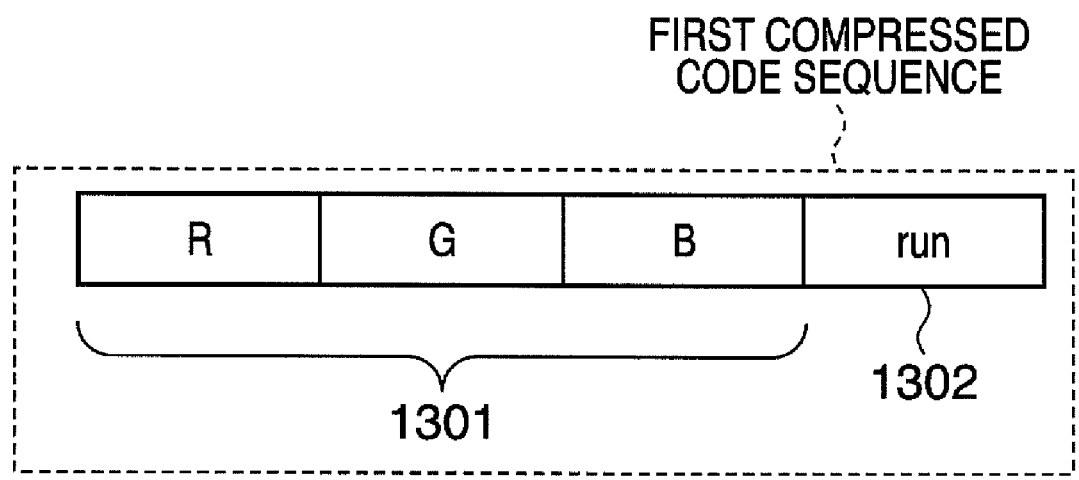
FIG. 8 is a view illustrating the first compressed code sequence generated in the image processing device according to the fourth embodiment of the present invention.

In this embodiment, pixel data forming drawing data output from the image construction unit 201 is represented by the color component amounts of R, G, and B. In this case, the first compressed code sequence compressed by runlength compression is formed of a partial code 1301 which represents the color of each pixel in an RGB color space and a partial code 1302 which indicates the length of a run of pixel data having the same value, as shown in FIG. 8.

Upon processing drawing data in a predetermined order, when there is a run of pixel data having the same value, the compression unit 202 uses the partial code 1302 to group them. On the other hand, when pixel data to be processed is different from the most recently-processed pixel data, the pixel data to be processed is added to the above-described first compressed code sequence without being grouped. Also, when the value of the partial code 1302 becomes larger than a predetermined threshold, pixel data to be processed at that time is added to the above-described first compressed code sequence. In a case of normal print data, an excellent compression effect can be obtained even from such a simple compression method.

Referring back to FIG. 7, reference numeral 203 denotes an extraction unit. The extraction unit 203 extracts the partial code 1301 containing information representing a color from the first compressed code sequence output from the compression unit 202 and outputs the extracted partial code 1301 to a color conversion unit 204. The extraction unit 203 also outputs the whole first compressed code sequence to a replacement unit 205.

The color conversion unit 204 performs color space conversion from pixel data in an RGB color space into that in a CMYK color space.

The replacement unit 205 replaces the first compressed code sequence output from the extraction unit 203 by using the partial code 1301 which was converted into pixel data in the CMYK color space by the color conversion unit 204, to generate the second compressed code sequence.

Figure 9:
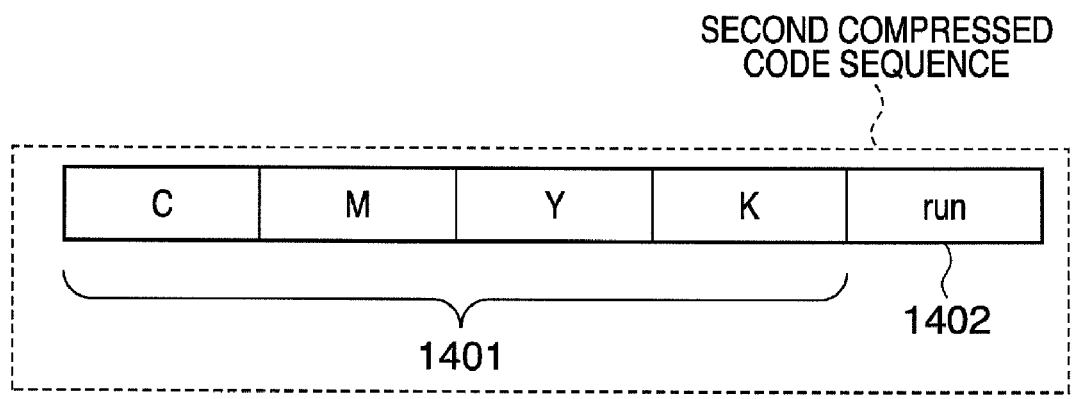
FIG. 9 is a view illustrating the second compressed code sequence generated in the image processing device according to the fourth embodiment of the present invention.

FIG. 9 is a view illustrating an example of the second compressed code sequence. As shown in FIG. 9, the second compressed code sequence is formed of a partial code 1401 which represents pixel data in the CMYK color space and a partial code 1402 which indicates the length of a run of pixel data having the same value. In the first compressed code sequence, the partial code 1301 includes pixel data of the RGB color space. On the other hand, in the second compressed code sequence, the partial code 1401 includes pixel data of the CMYK color space. Therefore, as shown in FIG. 9, the code length of the partial code 1401 is different from that of the partial code 1301.

Again, referring back to FIG. 7, reference numeral 206 denotes a decompression unit. The decompression unit 206 decompresses the second compressed code sequence generated in the replacement unit 205 to an uncompressed form. A quantization unit 207 converts the resolution of the image construction unit 201 and the number of output gray levels of the color conversion unit 204 into the resolution and number of gray levels corresponding to a printing unit 208, respectively, to generate color material amount data.

In the printing unit 208, print heads operate based on color material amount data to output it on a medium such as a paper sheet.

As is apparent from the above description, in this embodiment, the compression unit 202 to compress drawing data is connected to the input of the color conversion unit 204 to reduce the amount of drawing data processed in the color conversion unit 204. Hence, the load of color space conversion can be reduced.

According to this embodiment, since the amount of drawing data between the compression unit 202 and decompression unit 206 is reduced, the memory capacity of a buffer (not shown) arranged between them can be reduced.

Fifth Embodiment

In the above-described fourth embodiment, when there is a run of pixel data having the same value in drawing data formed of a series of pixel data, one of the pixel data is set as the partial code 1301 and the runlength is set as the partial code 1302 to generate the first compressed code sequence. However, the first compressed code sequence in the present invention is not limited to this. Details of this embodiment will be described hereinafter. Note that the functional arrangement of a printing apparatus according this embodiment is the same as in FIG. 7, and a repetitive description will be omitted.

<First Compressed Code Sequence Generated in Compression Unit 202 (1)>

Figure 10:
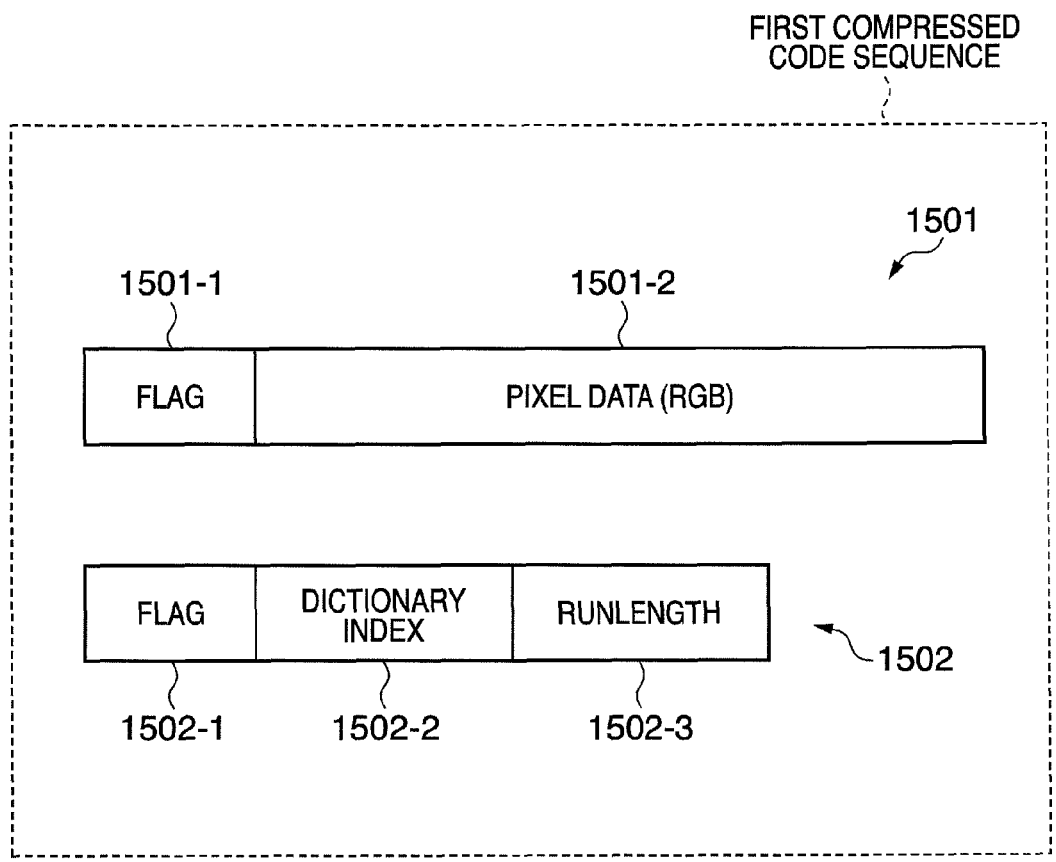
FIG. 10 is a view illustrating one example of the first compressed code sequence generated in the image processing device according to the fifth embodiment of the present invention.

FIG. 10 is a view illustrating the structure of the first compressed code sequence generated in a compression unit 202. FIG. 10 illustrates an example of the first compressed code sequence generated by the compression unit 202 when it processes pixel data which has not been processed before, upon processing drawing data formed of a series of pixel data.

As shown in FIG. 10, the first compressed code sequence in this case is formed of two kinds of codes (pixel data registration code 1501 and runlength code 1502). The pixel data registration code 1501 includes a flag 1501-1 for determining the code kind and pixel data 1501-2 of an RGB color space to be registered in a dictionary D (to be described later). On the other hand, the runlength code 1502 includes a flag 1502-1 for determining the code kind, a dictionary index (identification information) 1502-2 for identifying the pixel data 1501-2 registered in the dictionary D, and a runlength 1502-3 of a run of certain pixel data.

<First Compressed Code Sequence Generated in Compression Unit 202 (2)>

Figure 11:
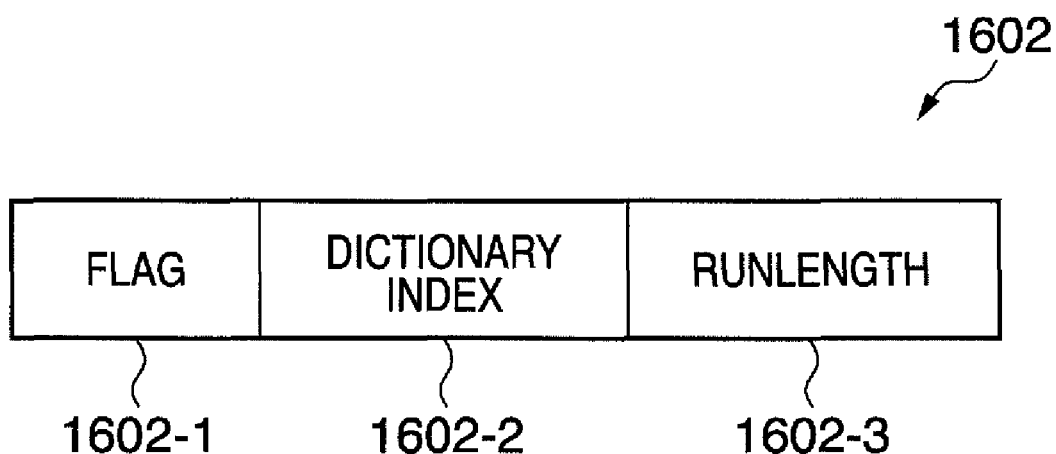
FIG. 11 is a view illustrating another example of the compressed code sequence generated in the image processing device according to the fifth embodiment of the present invention.

FIG. 11 is a view illustrating another structure of the first compressed code sequence generated in the compression unit 202. FIG. 11 illustrates an example of the first compressed code sequence generated by the compression unit 202 when it has already processed pixel data having the same value as pixel data to be processed, upon processing drawing data formed of a series of pixel data.

As shown in FIG. 11, the first compressed code sequence in this case is formed of a code (runlength code 1602) of only one kind. The runlength code 1602 includes a flag 1602-1 for determining the code kind, a dictionary index 1602-2 corresponding to the pixel data, and a runlength 1602-3 of a run of certain pixel data.

<Second Compressed Code Sequence Generated in Replacement Unit 205 (1)>

Figure 12:
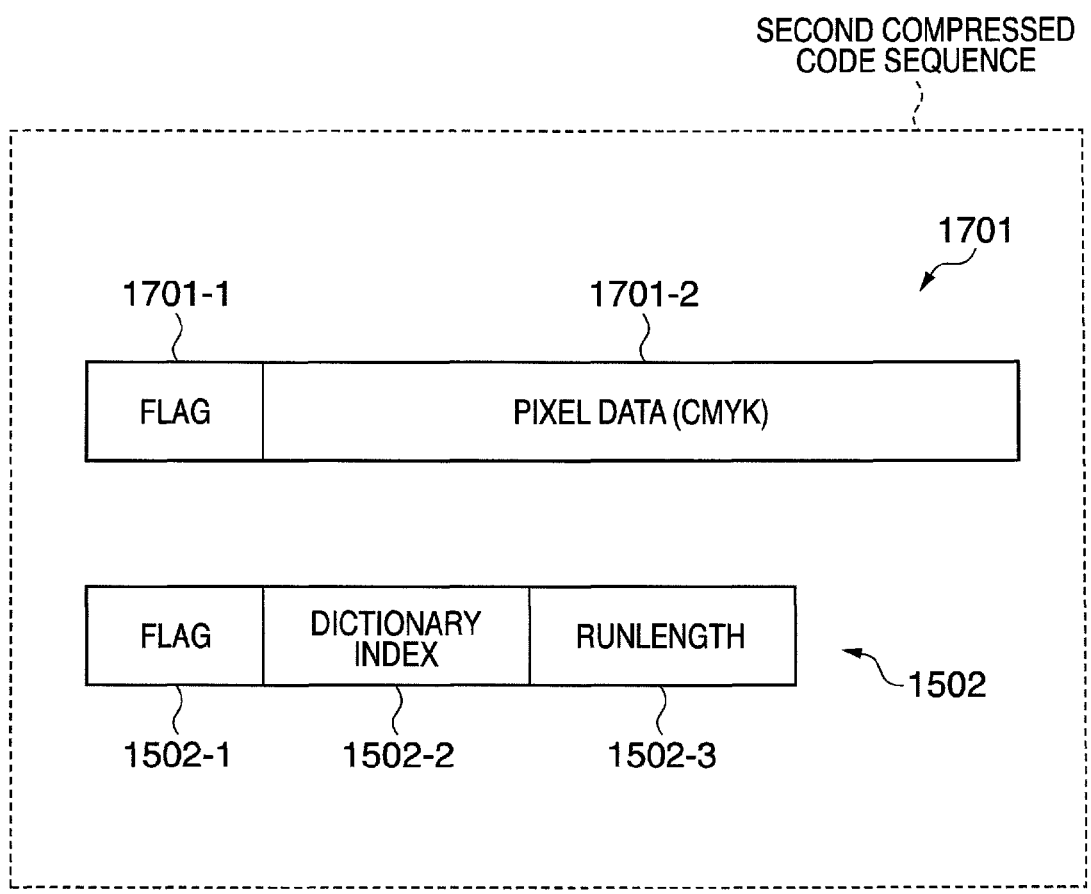
FIG. 12 is a view illustrating the second compressed code sequence generated in the image processing device according to the fifth embodiment of the present invention.

FIG. 12 is a view illustrating the structure of the second compressed code sequence generated in the replacement unit 205. FIG. 12 illustrates the second compressed code sequence generated when the compression unit 202 generated the first compressed code sequence (which includes the pixel data registration code 1501 and runlength code 1502) shown in FIG. 10.

As shown in FIG. 10, the first compressed code sequence, which is generated in the compression unit 202 when pixel data to be processed has not been processed before, includes the pixel data registration code 1501 and runlength code 1502. In this case, the extraction unit 203 extracts the pixel data 1501-2 (pixel data of RGB color space) of the pixel data registration code 1501, and the color conversion unit 204 performs color space conversion for the extracted code and outputs the converted code to the replacement unit 205. At the same time, the extraction unit 203 outputs the whole first compressed code sequence to the replacement unit 205.

Accordingly, as shown in FIG. 12, the second compressed code sequence is formed of two kinds of codes (pixel data registration code 1701 and runlength code 1502). The pixel data registration code 1701 includes a flag 1701-1 for determining the code kind and pixel data 1701-2 of a CMYK color space. The runlength code 1502 is generated in the compression unit 202.

More specifically, of the two kinds of codes forming the second compressed code sequence, the runlength code 1502 is identical with the runlength code 1502 of the first compressed code sequence generated in the compression unit 202.

On the other hand, of the two kinds of codes forming the second compressed code sequence, the pixel data registration code 1701 is a code obtained by replacing the pixel data 1501-2 of the first compressed code sequence by a color space-converted result obtained in the color conversion unit 204.

The pixel data 1701-2 obtained by performing color space conversion in the color conversion unit 204 is registered in the dictionary D in correspondence with the dictionary index 1502-2.

<Second Compressed Code Sequence Generated in Replacement Unit 205 (2)>

The structure of the second compressed code sequence generated in the replacement unit 205 is the same as in FIG. 11. The second compressed code sequence is generated when the compression unit 202 generated the first compressed code sequence (which includes only the runlength code 1602) shown in FIG. 11.

As has been described above, only the runlength code 1602 is included in the first compressed code sequence generated when the compression unit 202 has already processed pixel data having the same value as the pixel data to be processed, upon processing drawing data formed of a series of pixel data. In this case, only the runlength code 1602 is output to the replacement unit 205 through the extraction unit 203.

Accordingly, the second compressed code sequence is formed of only the runlength code 1602. The second compressed code sequence is identical with the runlength code 1602 of the first compressed code sequence generated in the compression unit 202. More specifically, the replacement unit 205 outputs the runlength code 1602 of the first compressed code sequence generated in the compression unit 202 as the second compressed code sequence.

<Structure of Dictionary D>

FIG. 13 is a view illustrating the structure of the dictionary D. As shown in FIG. 13, the dictionary D has the pixel data 1501-2 (pixel data of the RGB color space) included in the first compressed code sequence generated in the compression unit 202 and the dictionary index 1502-2. The dictionary D also has the pixel data 1701-2 (pixel data of the CMYK color space) that underwent color space conversion in the color conversion unit 204 and was output to the replacement unit 205 (these index and data are stored as a list in correspondence with each other).

More specifically, when the pixel data having the same value as the pixel data to be processed has been already processed, color space-converted pixel data of the pixel data to be processed can be acquired by using the dictionary D. Hence, there is no need to use the color conversion unit 204. Note that when color space-converted pixel data is acquired from the dictionary D, the dictionary index 1602-2 is used as a query.

<Process Sequence in Compression Unit 202>

Figure 14A:
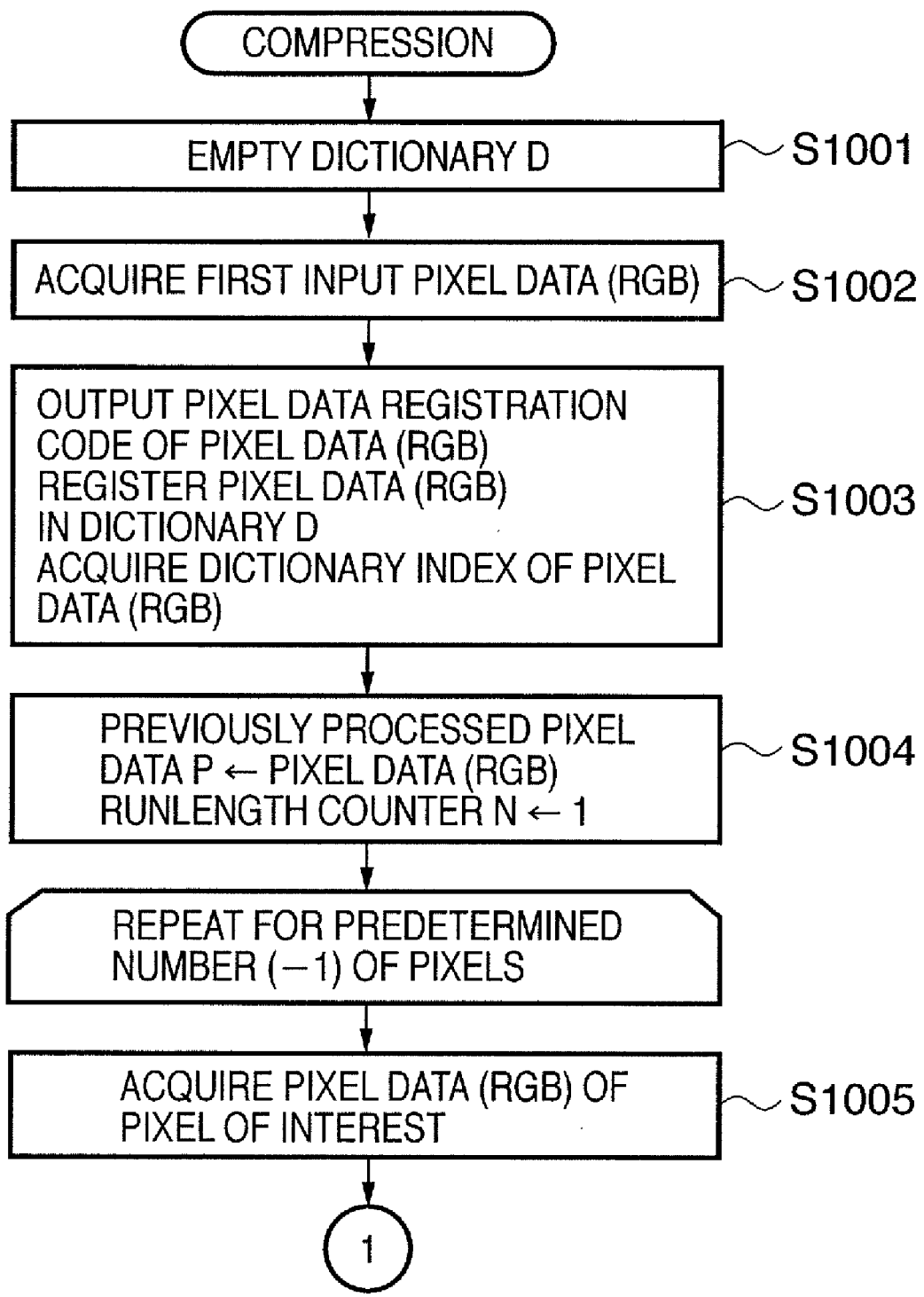

FIGS. 14A and 14B are flowcharts illustrating the process sequence in the compression unit 202 for generating the first compressed code sequence in this embodiment.

In step S1001, the compression unit 202, initializes the dictionary D. In step S1002, the compression unit 202 acquires the first pixel data (RGB) from drawing data formed of a series of pixel data. In step S1003, the compression unit 202 registers the first pixel data (RGB) acquired in step S1002 in the dictionary D. At this time, the compression unit 202 outputs the pixel data registration code 1501 including the first pixel data. Note that the dictionary index appended upon registration in the dictionary D is appended in the order of registration.

In step S1004, the compression unit 202 sets a previously processed pixel data P as a parameter used to determine the length of a run of pixel data having the same value and a runlength counter N of the run. More specifically, the first pixel data is set as the previously processed pixel data P, and the runlength counter N is set to 1. In order to sequentially process all pixel data of the drawing data formed of a series of pixel data, processes from steps S1005 to S1012 are repeated.

In step S1005, the compression unit 202 acquires the next pixel data (RGB) to be processed. In step S1006, the compression unit 202 determines whether there is a run of pixel data having the same value. More specifically, the compression unit 202 determines this by checking whether the pixel data (RGB) to be processed is equal to the previously processed pixel data P. When the pixel data (RGB) to be processed is determined to be equal to the previously processed pixel data P, the process advances to step S1007. Otherwise, the process advances to step S1008.

In step S1007, the compression unit 202 counts up the runlength counter N. On the other hand, in step S1008, the compression unit 202 outputs the runlength code (1502 or 1602) including the dictionary index of the previously processed pixel data P and the runlength counter N.

In step S1009, the compression unit 202 searches the dictionary D for the pixel data (RGB) to be processed to determine whether the pixel data (RGB) is registered in the dictionary D. When it is determined that the pixel data to be processed is already registered in the dictionary D, the process advances to step S1011. Otherwise, the process advances to step S1010.

In step S1010, like in step S1003, the compression unit 202 newly registers the pixel data (RGB) in the dictionary D. At this time, the compression unit 202 outputs the pixel data registration code 1501 including the newly registered pixel data. A new dictionary index to be used is incremented by one than the most recently-registered index. Note that when the dictionary index becomes larger than a predetermined number of colors registerable in the dictionary D, the oldest pixel data being registered is deleted, and the same dictionary index as the deleted pixel data is used as the index of the newly registered pixel data.

The process performed when the index becomes larger than a predetermined number of colors registerable in the dictionary D is not particularly limited to this. For example, a dictionary index to be deleted may be selected based on the reference history or reference frequency of pixel data registered in the dictionary D.

In step S1011, the compression unit 202 acquires the found dictionary index.

In step S1012, the compression unit 202 sets the previously processed pixel data P which is used to determine the length of a run of pixel data having the same value and the runlength counter N of the run. More specifically, the present pixel data (RGB) to be processed is set as the previously processed pixel data P. The runlength counter N is set to 1.

The processes from steps S1005 to S1012 are repeated a predetermined number of times. In step S1013, the compression unit 202 outputs the runlength code 1602 (pixel data registration code 1501 and runlength code 1502, in some cases) including the dictionary index of the previously processed pixel data P and runlength counter N.

In accordance with the sequence described above, the first compressed code sequence of pixel data included in a series of drawing data can be obtained.

The extraction unit 203 sequentially outputs the first compressed code sequence to the replacement unit 205. At this time, when the pixel data registration code 1501 is detected, the extraction unit 203 extracts and outputs it to the color conversion unit 204 and instructs the color conversion unit 204 to perform color space conversion.

The replacement unit 205 outputs the code same as the runlength code 1502 or 1602 in the first compressed code sequence as the runlength code 1502 or 1602 of the second compressed code sequence. The compression unit 202 replaces the pixel data registration code 1501 by the color space conversion result (CMYK value) 1701-2 acquired from the color conversion unit 204, and outputs the resultant code as the pixel data registration code 1701.

<Process Sequence in Decompression Unit 206>

Figure 15:
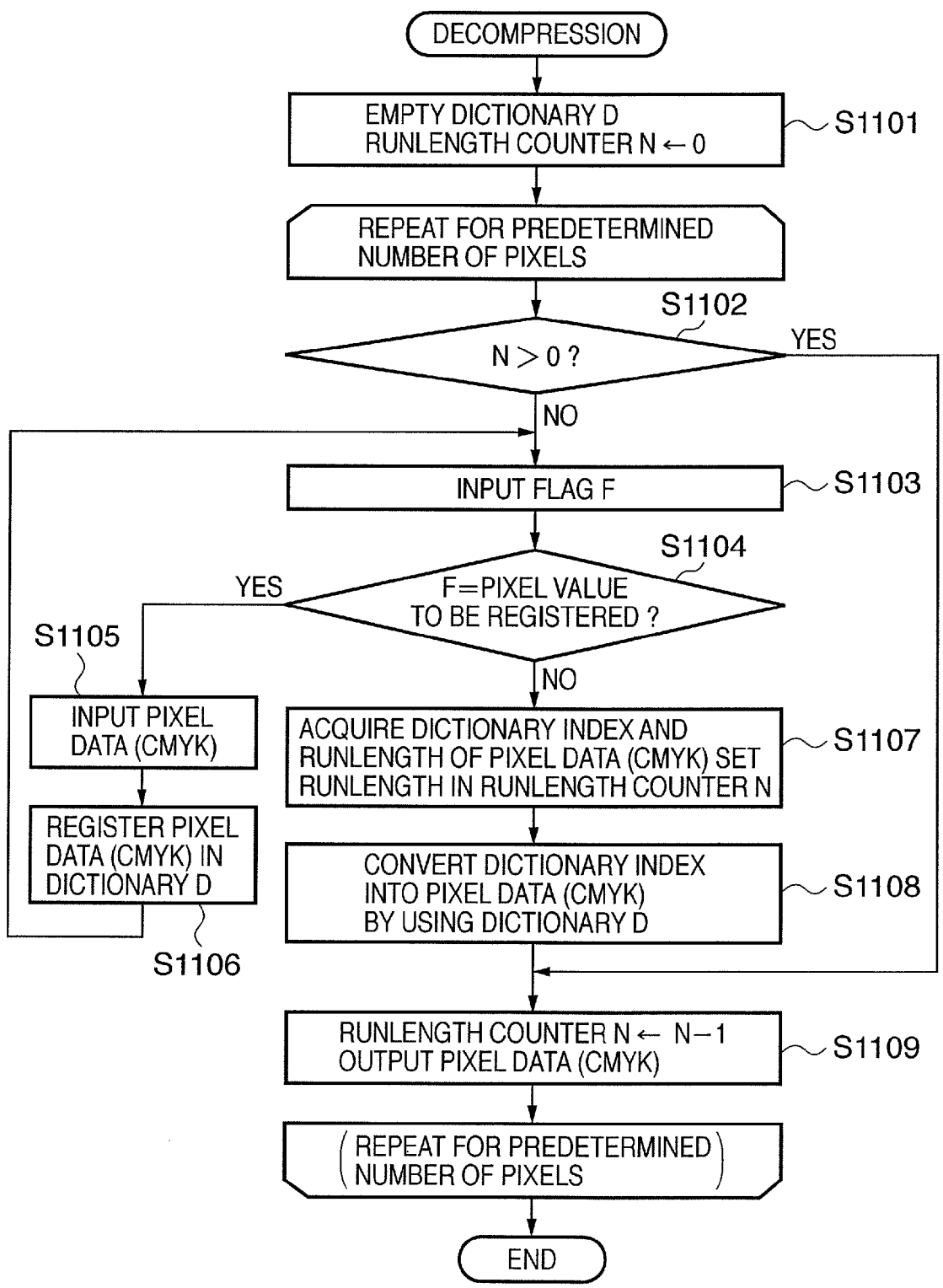
FIG. 15 is a flowchart illustrating the sequence of a decompression process in the image processing device according to the fifth embodiment of the present invention.

FIG. 15 is a flowchart illustrating the sequence of a decompression process in the decompression unit 206. The decompression unit 206 decompresses a code by using the dictionary D which can register a predetermined number of colors.

In step S1101, the decompression unit 206 initializes the dictionary D and a decompression process. By repeating a sequence of processes from steps S1102 to S1109, a predetermined number of pixel data can be obtained.

In step S1102, the decompression unit 206 determines whether it needs to input the second compressed code sequence. More specifically, until the runlength 1502-3 (or 1602-3) of the previous runlength code 1502 (or 1602) becomes 0, the process skips the processes from step S1103 and advances to step S1109 so that the same pixel data (CMYK) as the immediately preceding pixel data is output.

In step S1103, the decompression unit 206 inputs flags F (1701-1 and 1502-1 or 1602-1) of the pixel data registration code 1701 and runlength code 1502 (or 1602) of the second compressed code sequence.

In step S1104, the process advances to step S1105 or S1107 in accordance with the contents of the flags F. More specifically, when the second compressed code sequence includes the pixel data registration code 1701 and runlength code 1502 (that is, when it is the second compressed code sequence shown in FIG. 12), the process advances to step S1105. When the second compressed code sequence includes only the runlength code 1602 (that is, when it is the second compressed code sequence shown in FIG. 11), the process advances to step S1107.

In step S1105, the decompression unit 206 acquires the pixel data (CMYK) 1701-2 to be registered in the dictionary D. In step S1106, the decompression unit 206 registers the pixel data (CMYK) 1701-2 in the dictionary D.

On the other hand, in step S1107, the decompression unit 206 acquires the dictionary index 1602-2 and runlength 1602-3 and sets the runlength counter N to the acquired runlength 1602-3. In step S1108, the decompression unit 206 acquires pixel data (CMYK) from the dictionary index 1602-2 by using the dictionary D (With this process, color space-converted pixel data can be acquired. More specifically, when the second compressed code sequence has the structure shown in FIG. 11, the decompression unit 206 functions as a color conversion unit to perform color space conversion). In step S1109, the decompression unit 206 outputs the acquired pixel data and decrements the runlength counter N.

As is apparent from the above description, according to this embodiment, when pixel data to be processed by the compression unit 202 is registered in the dictionary D, no pixel data registration code 1501 is generated, and hence the color conversion unit 204 performs no color space conversion. That is, since color space conversion is performed once for each pixel data registration code 1501, the processing load of color space conversion is further reduced.

The pixel data registration code 1501 is generated only when each color is used for the first time, or when it is used for the first time after it has been deleted from the dictionary D. That is, the case in which the pixel data registration code 1501 is generated can be considered to correspond to a case in which a cache is applied to a look-up table in color space conversion and a cache miss occurs. Compared to the structure using a cache in color space conversion, however, this embodiment can provide an additional effect of reducing the memory amount of a buffer since the amount of data is reduced by compression. In addition, the number of times of color space conversion can be reduced since the amount of data is reduced by compression. This leads to reduction in power consumption of the device.

Other Embodiment

The present invention may be applied to a system constituted by a plurality of devices (for example, a host computer, an interface device, a reader, a printer, and the like) or an apparatus comprising a single device (for example, a copying machine, a facsimile apparatus, or the like).

The object of the present invention is implemented even by supplying a storage medium storing software program codes for implementing the functions of the above-described embodiments to a system or an apparatus. In this case, the above-described functions can be implemented by causing the computer (or a CPU or an MPU) of the system or the apparatus to read out and execute the program codes stored in the storage medium. In this case, the storage medium storing the program codes constitutes the present invention.

As a storage medium for supplying the program codes, for example, a hard disk, an optical disk, a magnetooptical disk, a CD-ROM, a CD-R, a magnetic tape, a nonvolatile memory card, a ROM, or the like can be used.

The functions of the above-described embodiments are implemented not only when the readout program codes are executed by the computer. For example, the functions of the above-described embodiments are implemented also when the OS (Operating System) running on the computer performs part or all of actual processing based on the instructions of the program codes.

The functions of the above-described embodiments are also implemented when the program codes read out from the storage medium are written in the memory of a function expansion board inserted into the computer or a function expansion unit connected to the computer. That is, after the program codes are written in the memory, the CPU of the function expansion board or function expansion unit performs part or all of actual processing based on the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188679 and No. 2006-188680 filed on Jul. 7, 2006, which are hereby incorporated by reference herein in their entirety.

What is claimed is:

1. An output device which outputs quantized data, corresponding to a color material used by a printing unit, to the printing unit, the output device comprising:

a registration unit configured to register the color information of pixel data in a dictionary;

an encoding unit configured to encode image data by generating a code which indicates the length of a plurality of contiguous pixel data having identical color information and a dictionary index at which said color information is registered;

an extraction unit configured to extract the color information as the index of the dictionary from the encoded image data;

a conversion unit configured to convert each of the extracted color information registered in the dictionary into a color space of the printing unit by using a look-up table;

a decoding unit configured to decode the encoded image data having the converted color information based on the code; and a quantization unit configured to convert a part of the decoded image data into quantized data corresponding to a resolution of the printing unit and output the quantized data to the printing unit.

2. An output method of outputting quantized data, corresponding to a color material used by a printing unit, to the printing unit, the output method comprising:

registering the color information of pixel data in a dictionary;

encoding image data by generating a code, which indicates the length of a plurality of contiguous pixel data having identical color information and a dictionary index at which said color information is registered;

extracting the color information as the index of the dictionary from the encoded image data;

converting each of the extracted color information registered in the dictionary into a color space of the printing unit by using a look-up table;

decoding the encoded image data having the converted color information based on the code;

quantizing a part of the decoded image data into quantized data corresponding to a resolution of the printing unit; and outputting the quantized data to the printing unit.

3. An output device which outputs pixel data, corresponding to a color material used by a printing unit, to the printing unit, the output device comprising:

a count unit configured to count contiguous first pixel data having an identical value and generate a compressed code sequence including the count value and identification information which indicates the first pixel data;

a conversion unit configured to convert each of the first pixel data counted by the count unit into second pixel data of a color space of the printing unit by using a look-up table;

a registration unit configured to register the first pixel data and the second pixel data in a dictionary;

an output unit configured to receive the registered second pixel data, which corresponds to the identification information included in the compressed code sequence, among the second pixel data registered by the registration unit in accordance with the count value included in the compressed code sequence, and output the received second pixel data a number of times to the printing unit, wherein the number corresponds to the count value.

4. An output method of outputting pixel data, corresponding to a color material used by a printing unit, to the printing unit, the output method comprising:

counting contiguous first pixel data having an identical value;

generating a compressed code sequence including the count value and identification information which indicates the first pixel data;

converting each of the first pixel data counted in the counting step into second pixel data of a color space of the printing unit by using a look-up table;

registering the first pixel data and the second pixel data in a dictionary;

receiving the registered second pixel data, which corresponds to the identification information included in the compressed code sequence, among the second pixel data registered in the registering step in accordance with the count value included in the compressed code sequence; and outputting the received second pixel data a number of times to the printing unit, wherein the number corresponds to the count value.

* * * * *